United States Patent

[11] 3,568,930

[72] Inventor Andrew P. Kuchar
    West Chester, Ohio
[21] Appl. No. 852,598
[22] Filed Aug. 25, 1969
[45] Patented Mar. 9, 1971
[73] Assignee General Electric Company

[54] TURBINE ENGINE THRUST REVERSER/SPOILER UTILIZING STAGGERED BLOCKER DOORS
8 Claims, 4 Drawing Figs.

[52] U.S. Cl. ........................................... 239/265.19,
    60/229, 244/113
[51] Int. Cl. ........................................... B63h 11/10
[50] Field of Search ................................ 239/265.19,
    265.25, 265.27, 265.33, 265.37, 265.39; 60/228,
    229, 230; 244/52, 113, 12 (D), 23 (D)

[56] References Cited
UNITED STATES PATENTS
3,456,881  7/1969  Beitler et al. ............... 239/265.19

*Primary Examiner*—M. Henson Wood, Jr.
*Assistant Examiner*—Edwin D. Grant
*Attorneys*—Derek P. Lawrence, E. S. Lee, III, Lee H. Sachs, Frank L. Neuhauser and Oscar B. Waddell ABSTRACT: A target-type thrust reverser for a gas turbine engine. The reverser utilizes blocker doors positioned within an exhaust nozzle for turning the main portion of exhaust gas flow radially outwardly. The doors are staggered to permit a percentage of exhaust gas flow to leak therethrough. Swirl inducers formed as part of the doors provide a circumferential velocity vector to the leakage flow and thereby induce a high total pressure loss in the leakage flow. The forward thrust associated with the leakage flow is thereby minimized.

PATENTED MAR 9 1971 3,568,930
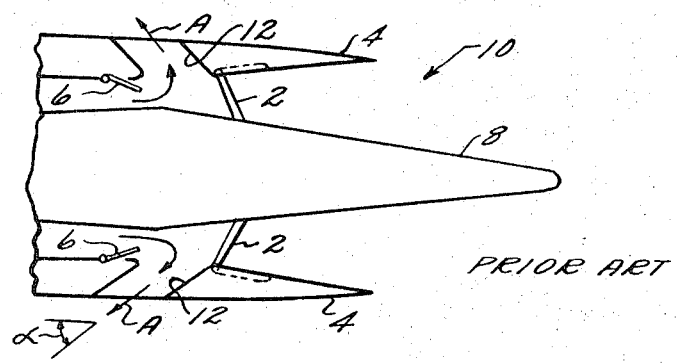
Fig 1
PRIOR ART
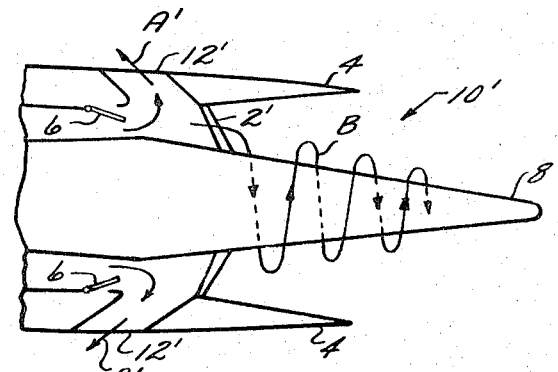
Fig 2
Fig 3
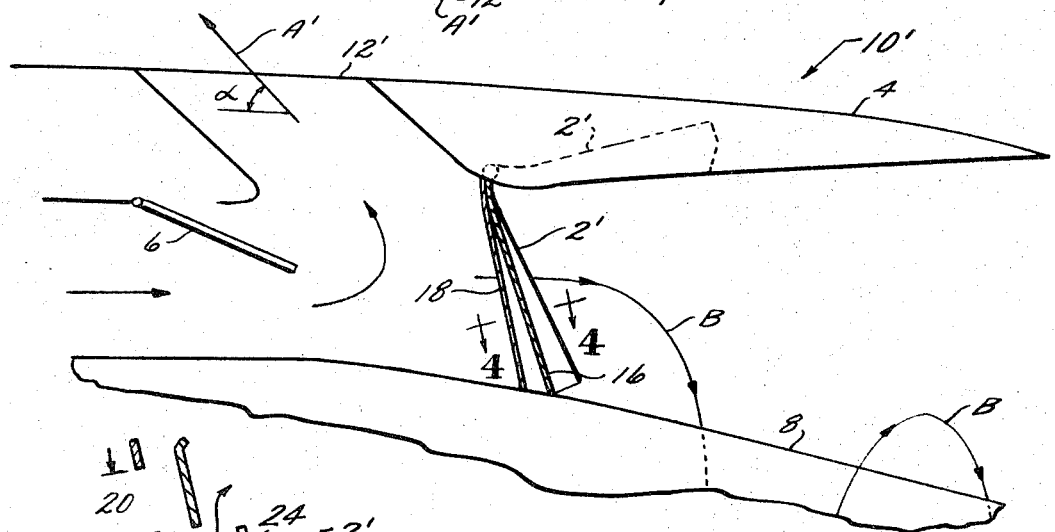
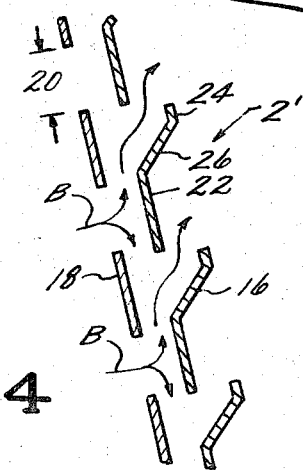
Fig 4
INVENTOR.
ANDREW P. KUCHAR
BY
T. J. Bird, Jr.
AGENT—

TURBINE ENGINE THRUST REVERSER/SPOILER UTILIZING STAGGERED BLOCKER DOORS

The invention described and claimed in the U.S. patent application herein resulted from work done under U.S. Government contract FA-SS-66-6. The U.S. Government has an irrevocable, nonexclusive license under said application to practice and have practiced the invention claimed herein, including the unlimited right to sublicense others to practice and have practiced the claimed invention for any purpose whatsoever.

BACKGROUND OF THE INVENTION

The present invention relates generally to a thrust reverser for a gas turbine engine and, more particularly, to a target-type thrust reverser which utilizes blocker doors which permit a percentage of the gas flow to pass therethrough.

In gas turbine engine powered commercial aircraft, thrust reversing means are generally provided in order to slow down the aircraft upon landing without putting undue strain on the undercarriage and braking system of the aircraft. Various types of thrust reversing mechanisms have been designed and are in use with varying degrees of success and life. All of them are designed to reduce the forward thrust of the engine by directing gas flow away from the line of thrust and, in the most practical application, directing it forwardly so that a component of thrust is obtained in the opposite or forward direction to slow down the aircraft.

In present day supersonic aircraft the exhaust nozzle of the gas turbine engine must first converge and then diverge to provide optimum thrust. In aircraft where a wide range of nozzle pressure ratios (i.e., the ratio of the pressure upstream of the sonic plane-or throat-to ambient pressure) are likely to be encountered, it is generally desirable to arrange to vary both the minimum area, or throat, and the nozzle exit area, or diverging portion, of the exhaust nozzle to maintain high exhaust system performance over the entire operating range. For these reasons, an annular nozzle, generally known as a plug nozzle, has come into widespread use. In this type of nozzle, a generally conical nozzle centerbody which tapers in a downstream direction is utilized to provide the inner boundary of the throat area and the divergent expansion surface for the exhaust gases of the gas turbine engine.

Typically, thrust reversal means for gas turbine engines have taken the form of large so-called blocker doors pivotally mounted about the engine centerline in such a position as to be capable of being moved into the path of the exhaust gases. Fairly complicated mechanisms, including links, actuators, tracks, rods, and the like are usually needed to accomplish movement of the blockage doors. This type of system, however, adds a large amount of weight to the basic engine which thereby reduces the amount of payload capable of being carried by the aircraft powered by the engine. For this reason, it was desirable to provide a thrust reverser located directly within the converging-diverging nozzle area of the gas turbine engine. Thus, combination thrust reversers and jet exhaust nozzles similar to that shown in U.S. Pat No. 3,347,467—Carl, have come into use. This type of thrust reverser utilizes doors positioned directly within the converging-diverging nozzle and is generally referred to as a "target-type" reverser.

The nature of the flow mechanism of a target-type reverser is such that the turning of the exhaust gases at a high velocity (mach number ≈ 1.0) imparts a high total pressure loss to the exhaust gases and thereby reduces the forward thrust of the engine. A large reverser exit area, however, is required in order to pass the exhaust gases without affecting the primary nozzle flow conditions, while still maintaining the proper reversed flow discharge angle needed to attain some reasonable amount of reversed thrust. This situation becomes aggravated when circumferential blockage due to support structure surrounding the engine exhaust nozzle is considered, and becomes further aggravated when aircraft imposed exit flow limitations are considered. The situation is further worsened because of the large primary nozzle diameter required in a plug-type converging-diverging nozzle. Simply stated, the problem is one of trying to obtain a specified amount of reversed thrust without affecting normal engine operating conditions in a power plant where little "room" is available to achieve the desired result.

SUMMARY OF THE INVENTION

The primary object of this invention, therefore, is to provide a target-type thrust reverser wherein the thrust reverser exit area requirements are significantly lessened while still providing the desired amount of reversed thrust.

Briefly stated, the object of this invention is accomplished by providing a thrust reverser which incorporates "staggered" blocker doors such that a substantial amount of exhaust gas flow is discharged (leaked) through the blocker doors. The blocker doors are also provided with swirl inducers which induce a high total pressure loss and a circumferential velocity vector in the "leakage" flow, thereby destroying practically all of the forward thrust of the "leakage" flow. This permits reduction in the thrust reverser exit area while still providing the desired amount of reverse thrust.

BRIEF DESCRIPTION OF THE DRAWINGS

The specification concludes with claims particularly pointing out and distinctly claiming the subject matter of the invention which is sought to be protected. An understanding of the invention may be gained, however, from the following detailed description of a preferred embodiment which is meant to be typical of, though not limiting on, the scope of the attached claims. The preferred embodiment is described in connection with the accompanying drawings, in which:

FIG. 1 is a generally schematic view of a thrust reverser constructed in accordance with the prior art;

FIG. 2 is a generally schematic view of a thrust reverser constructed in accordance with this invention;

FIG. 3 is an enlarged partial sectional view showing a portion of a thrust reverser constructed in accordance with this invention; and FIG. 4 is a sectional view taken along line 4-4 of FIG. 3.

Referring to the FIGS. wherein like numerals refer to like elements throughout, the general operation of a target-type thrust reverser is shown in FIG. 1. As shown therein, a plurality of blocker doors 2 are positioned within a number of secondary nozzle flaps 4. Located upstream of the secondary nozzle flaps 4 are a plurality of primary nozzle flaps 6. The secondary nozzle flaps 4 and the primary nozzle flaps 6 cooperate with a nozzle centerbody 8, which tapers in a downstream direction as shown to provide the inner boundary of both the throat area and the divergent expansion surface of a typical converging-diverging supersonic exhaust nozzle, generally designated by the numeral 10. The primary air flaps 6 cooperate with the forward portion of the centerbody 8 to provide the throat area of the converging-diverging nozzle 10, while the secondary air flaps 4 cooperate with the conical portion of the centerbody 8 to provide the diverging exhaust nozzle. The centerbody 8 may be fixed in position or may move axially along the centerline of the gas turbine engine in order to provide greater variance in the throat area and exhaust area. The elements as thus far described are conventional and are merely illustrative of the type of nozzle which could make use of the thrust reverser of the present invention.

As previously mentioned the blocker doors 2 are pivotally supported within the secondary air flaps 4. During normal forward thrust operation the blocker doors 2 are stowed within the secondary nozzle flaps as shown by their dotted line position. In this position, the blocker doors 2 form part of the diverging portion of the converging-diverging nozzle 10. When reverse thrust is desired in order to enable an aircraft to lower its speed more quickly upon landing, the blocker doors 2 are pivoted to their solid line position of FIG. 1 wherein they lie in contact with the outer surface of the centerbody 8. In this position, the blocker doors turn the entire gas flow and prevent it from leaving through the normal exhaust nozzle. The flow instead leaves through a plurality of generally radial exhaust areas designated by the numerals 12. The gas flow thus follow the general direction of the arrows A and has associated with it a discharge angle $\alpha$. This angle determines to a great extent the amount of reverse thrust obtained, i.e., the smaller the angle is, the greater the reverse thrust is. Because there is a forward velocity component associated with gas flow in the direction of arrow A, the gas turbine engine provides quick stoppage to an aircraft upon landing when the blocker doors 2 are in their thrust reversal position.

As previously discussed, one of the problems associated with a target-type thrust reverser similar to that shown in FIG. 1 is that a large amount of high velocity gas must be passed through the exhaust areas 12 in order to maintain the primary nozzle flow conditions (as defined mainly by the primary nozzle flaps 6) at a suitable level while still providing the required amount of reverse thrust. This problem could fairly easily be solved if there were no restrictions on the size of the radial exit areas 12. However, when circumferential blockage due to support structure, e.g., an aircraft wing or fuselage, or when aircraft imposed exit flow limitations are considered, the problem of providing a suitable exhaust area 12 while maintaining the discharge angle alpha small enough to obtain the desired thrust reversal becomes quite extensive.

Stated simply, the problem becomes one of maintaining the exit angle $\alpha$ small enough to provide the desired thrust reversal while providing a large enough thrust reversal exit area to prevent undesired effects to the primary nozzle flow conditions. The system described herein accomplishes the desired result with a minimum of complexity and weight. As shown in FIGS. 2—4, the system envisages utilizing a plurality of blocker doors 2' designed to permit a percentage of the gas flow to pass therethrough. In order to eliminate the forward thrust associated with the flow which passes through the blocker doors 2', the blocker doors 2' are provided with swirl inducers 16. The swirl inducers 16 provide a generally clockwise (when viewed from the exhaust end of the gas turbine engine) swirl to the passed flow. This result is shown schematically in FIG. 2.

Suitable hardware for accomplishing the above result is shown in FIGS. 3 and 4. As pictured therein, the blocker doors 2' are constructed in accordance with this invention comprise the swirl inducer 16 and a flat plate 18, physically connected to one another, as by welding near their pivotally supported ends and spaced apart near their opposite ends. The flat plates 18 are sized so as to provide a small passageway 20 (FIG. 4) between each pair thereof when positioned in the reverser position. The swirl inducers 16 are staggered in relation to the flat plates 18, as also shown in FIG. 4, so as to prevent direct gas flow through the blocker doors 2'. Gas flow generally flows through the blocker doors as shown by the arrows B.

The swirl inducers 16 are comprised of three portions 22, 24, and 26. The portions 22 and 24 are shown to be generally rectangular in cross section and are disposed generally parallel to the flat plate 18. The portions 22 and 24 are physically connected to one another by means of the portion 26, which lies at an angle to the flat plate 18, as best shown in FIG. 4. The function of the swirl inducers 16 is to provide a circumferential velocity component to the gas flow which passes through the passageways 20. The result of passage through the blocker doors 2' is shown schematically in FIG. 2 as gas flow B. The amount of flow through the doors 2' depends mainly on the size of the passageways 20 and on the size of the gaps between the swirl inducers 16.

The total effect of the staggered flat plates 18 and the swirl inducers 16 is to induce a high total pressure loss and a circumferential velocity vector to the flow which passes through the blocker doors 2' thereby destroying practically all of the forward thrust associated with the passed flow. Because of the flow through through the blocker doors 2'less gas flow is now passing through the reverser exhaust area 12'. Therefore, in order to maintain the reversed thrust at a desired level, the discharge angle alpha must be made smaller. The exhaust area 12' may also be made smaller because of the reduced exit flow. The new exit area and discharge angle $\alpha$ are thus compatible with aircraft imposed exit flow limitations.

While only a single embodiment has been described in detail, it should be obvious that certain changes could be made in the blocker doors 2'.

For example, the flat plate portions 18 could be eliminated in certain designs and the swirl inducers 16 would solely control the amount of leakage flow. Larger, solid doors could also be used with slots or openings provided therein to pass a certain percentage of flow therethrough. Lips of some type could be provided over the slots to induce the circumferential velocity vector in the leakage flow. These and other variations would appear to fit within the broader aspects of applicant's invention.

From the above description it can readily be seen that applicant has provided a simple thrust reversal system wherein a substantial amount of gas flow is deliberately allowed to leak through the blocker doors with a very low resulting forward thrust component. This leakage flow permits substantial reduction in the size of the needed reverser exit areas while still providing the desired amount of thrust reversal. The system described provides these advantages without adding excess weight to the power plant in the form of turning vanes, separate exits and covers, or extra linkage systems for moving additional flaps. The system described has the capability of in flight operation and of thereby proving thrust modulation during flight. The system has been shown with a plug nozzle but would be capable of usage with any type of gas turbine exhaust nozzle.

I claim:

1. A blocker door for use with a target-type thrust reverser having a stored position and a reverser position for controlling the exhaust gas flow associated with a gas turbine engine, said blocker door comprising means for turning a first portion of the gas flow radially outwardly when in the reverser position, means for passing the remaining portion of the gas flow therethrough, and further means for providing a circumferential velocity vector in said remaining portion, whereby the forward thrust component associated with said remaining portion is substantially reduced.

2. The blocker door recited in claim 1 wherein said turning means comprise a plurality of flat plate members sized to provide gaps therebetween when in the reverser position.

3. The blocker door recited in claim 2 wherein said means for providing the circumferential velocity vector are located downstream of and opposite the gaps provided by said turning means such that straight axial flow through said blocker door is substantially prevented.

4. The blocker door recited in claim 3 wherein said means for providing circumferential velocity vector comprise a member having at least a portion thereof lying at an angle with respect to said flat plate member.

5. In a thrust reverser for use with a gas turbine engine exhaust nozzle, which reverser includes a plurality of blocker doors pivotally supported within the exhaust nozzle for rotation between a stored position and a reversal position in which they block the normal exhaust nozzle and turn the gas flow radially outward, the improvement which comprises:
   a. blocker doors which are staggered such that they permit a portion of the gas flow to pass therethrough when in the reversal position; and
   b. swirl inducers positioned respective said blocker doors to provide circumferential velocity vector in the gas flow which passes through the blocker doors, thereby substantially eliminating the forward thrust component associated with said gas flow.

6. The thrust reverser recited in claim 5 in combination with an exhaust nozzle comprising a plurality of primary nozzle flaps, a plurality of secondary nozzle flaps located downstream of said primary flaps, a plurality of circumferentially spaced reverser exits located between said primary flaps and said secondary flaps, and a substantially conical, tapered engine centerbody, said centerbody cooperating with said primary and secondary flaps to provide an annular exhaust nozzle.

7. The thrust reverser recited in claim 6 wherein said blocker doors are pivotally supported within said secondary nozzle flaps.

8. The thrust reverser of claim 7 wherein said blocker doors are capable of pivoting from a stored position to a reverser position wherein they lie in contact with the outer portion of said centerbody, thereby substantially closing the normal exhaust passage of the exhaust nozzle.